United States Patent
Uchida et al.

(10) Patent No.: US 10,740,592 B2
(45) Date of Patent: Aug. 11, 2020

(54) THREE-DIMENSIONAL OBJECT GROUND-CONTACT DETERMINING APPARATUS

(71) Applicants: TOYOTA JIDOSHA KABUSHIKI KAISHA, Toyota-shi, Aichi (JP); DENSO CORPORATION, Kariya, Aichi-pref (JP)

(72) Inventors: Naohide Uchida, Numazu (JP); Fumio Sugaya, Susono (JP); Ken Tanabe, Kariya (JP); Hirotake Ishigami, Okazaki (JP); Masaki Kuwahara, Nukata-gun (JP)

(73) Assignees: TOYOTA JIDOSHA KABUSHIKI KAISHA, Toyota-shi, Aichi-ken (JP); DENSO CORPORATION, Kariya, Aichi-Pref (JP)

( * ) Notice: Subject to any disclaimer, the term of this patent is extended or adjusted under 35 U.S.C. 154(b) by 132 days.

(21) Appl. No.: 16/145,361

(22) Filed: Sep. 28, 2018

(65) Prior Publication Data
US 2019/0102602 A1    Apr. 4, 2019

(30) Foreign Application Priority Data
Sep. 29, 2017    (JP) .................................. 2017-191579

(51) Int. Cl.
*G06K 9/00*    (2006.01)
*G08G 1/04*    (2006.01)
(Continued)

(52) U.S. Cl.
CPC ..... *G06K 9/00201* (2013.01); *G06K 9/00805* (2013.01); *G08G 1/04* (2013.01);
(Continued)

(58) Field of Classification Search
CPC .. G06K 9/00201; G06K 9/00805; G08G 1/04; G08G 1/166; G08G 1/165; H04N 13/239; H04N 2013/0081
See application file for complete search history.

(56) References Cited

U.S. PATENT DOCUMENTS

| | | | |
|---|---|---|---|
| 2008/0205706 A1* | 8/2008 | Hongo | B60R 1/00 382/104 |
| 2018/0032823 A1* | 2/2018 | Ohizumi | B60R 1/00 |
| 2019/0266745 A1* | 8/2019 | Gomezcaballero | G06K 9/00798 |

FOREIGN PATENT DOCUMENTS

JP    2013-161434 A    8/2013

OTHER PUBLICATIONS

I. Haller et al. "Real-time semi-global dense stereo solution with improved sub-pixel accuracy" 2010 IEEE Intelligent Vehicles Symposium University of California; Jun. 21-24, 2010; pp. 1-8; San Diego, CA. USA.

* cited by examiner

*Primary Examiner* — Phuoc Tran
(74) *Attorney, Agent, or Firm* — Sughrue Mion, PLLC

(57) ABSTRACT

An apparatus comprises three-dimensional object detecting means for detecting a three-dimensional object in a taken image, temporarily determining means for calculating, based on parallax information, a lower end height from a road surface to a lower end of the object, for temporarily determining that the object is a ground-contacting object when the lower end height is less than or equal to a threshold, and for temporarily determining that the object is a floating object when the lower end height exceeds the threshold, and finally determining means for finally determining whether the object is a ground-contacting object or a floating object. The finally determining means finally (Continued)

determines that the object is a ground-contacting object at the current computation timing when the object is determined to be a ground-contacting object in at least one of the temporary determination at the current computation timing and the final determination at the previous computation timing.

4 Claims, 9 Drawing Sheets

(51) Int. Cl.
*H04N 13/239* (2018.01)
*G08G 1/16* (2006.01)
*H04N 13/00* (2018.01)

(52) U.S. Cl.
CPC ........... *H04N 13/239* (2018.05); *G08G 1/166* (2013.01); *H04N 2013/0081* (2013.01)

THREE-DIMENSIONAL OBJECT GROUND-CONTACT DETERMINING APPARATUS

TECHNICAL FIELD

The present invention relates to a three-dimensional object ground-contact determining apparatus for determining whether a three-dimensional object existing in front of a vehicle is a ground-contacting object which is ground-contacted with a road surface or a floating object floating from a road surface.

BACKGROUND ART

Collision avoidance control has been conventionally performed as one embodiment of driving support, the collision avoidance control being a control for avoiding a collision with a three-dimensional object existing in front of a vehicle or for reducing an impact due to the collision. In order to perform a proper collision avoidance control, it is important to detect a three-dimensional object with a high accuracy, and various apparatuses for detecting a three-dimensional object have been developed lately. For example, the Japanese Patent Application Laid-Open (kokai) No. 2013-161434 discloses an apparatus for detecting a three-dimensional object based on an image taken by a stereo camera.

SUMMARY OF THE INVENTION

A three-dimensional object is roughly classified into a ground-contacting object which is ground-contacted with a road surface (typically, an other vehicle, a pedestrian, a building, a street tree and the like) and a floating object floating from a road surface (typically, a plastic bag, a balloon, and the like).

In general, the floating object is light and hardly applies any impact on the vehicle when colliding with this vehicle. Therefore, if the collision avoidance control is performed even for the floating object, a driver may feel annoyed against this control. Hence, it has been desired to develop a technique (three-dimensional object ground-contact determining apparatus) for determining whether a three-dimensional object is a ground-contacting object or a floating object with a high accuracy.

Inventors are examining an apparatus for determining that a three-dimensional object is a ground-contacting object when a height from a road surface to a lower end of the three-dimensional object (hereinafter, may be referred to as a "lower end height") is less than or equal to a predetermined height threshold and determining that the three-dimensional object is a floating object when the height exceeds the height threshold.

In a case when detecting a three-dimensional object, using such an apparatus, based on a taken image acquired by a stereo camera mounted on a vehicle, a three-dimensional object may be falsely determined to be a floating object due to a reason described below. That is, as shown in FIG. 6, there exists a region (an occlusion region R) in front of the vehicle, the region being not included in the taken image of the camera. This region is inevitably generated, for example, due to a limitation of an angle of view of the camera and/or because imaging areas of cameras are blocked by a hood (bonnet) of the own vehicle.

When a three-dimensional object A who is ground-contacted with a road surface exists in the occlusion region R, a part of the three-dimensional object A, the part being included in the occlusion region R is not included in the imaging area. Therefore, a lower end position (Pa1) of the three-dimensional object A is recognized as an upper end part (Pa2) of the occlusion region R. As a result, there may be a case where a lower end height of the three-dimensional object A exceeds the height threshold in spite of the three-dimensional object A being actually a ground-contacting object, and in this case, the three-dimensional object A may be falsely determined to be a floating object.

The present invention is made to resolve the problem above. That is, one of objects of the present invention is to provide a three-dimensional object ground-contact determining apparatus capable of making a determination of whether a three-dimensional object is a ground-contacting object or a floating object with a higher accuracy.

A three-dimensional object ground-contact determining apparatus according to the present invention (Hereinafter, this apparatus will be referred to as a "present invention apparatus".) is mounted on a vehicle.

This present invention apparatus comprises;

imaging means (11, step 1002) for taking an image of a region in front of the vehicle by means of a stereo camera;

parallax information calculating means (step 1006) for calculating, based on a taken image taken by the imaging means (11), parallax information including a parallax of each of pixels composing the taken image;

three-dimensional object detecting means (step 1012) for detecting a three-dimensional object in the taken image based on the parallax information;

temporarily determining means (steps 1018, 1032);

for calculating, based on the parallax information, a lower end height (h) which is a height from a road surface to a lower end of the detected three-dimensional object; and for making a temporary determination every time a predetermined computation interval elapses to temporarily determine that the three-dimensional object is a ground-contacting object which is ground-contacted with the road surface when the lower end height (h) is less than or equal to a predetermined threshold, and to temporarily determine that the three-dimensional object is a floating object floating from the road surface when the lower end height (h) exceeds the predetermined threshold; and finally determining means (steps 1022, 1026, 1038, 1048) for making a final determination every time the predetermined computation interval elapses to finally determine whether the three-dimensional object is a ground-contacting object or a floating object, wherein, the finally determining means is configured to;

finally determine (step 1038) that the three-dimensional object is a ground-contacting object at a current computation timing when it is determined that the three-dimensional object is a ground-contacting object in at least one of the temporary determination at a current computation timing and the final determination at a previous computation timing; and finally determine (step 1048) that the three-dimensional object is a floating object at a current computation timing when it is determined that the three-dimensional object is a floating object in both of the temporary determination at a current computation timing and the final determination at a previous computation timing.

Even in a case where a three-dimensional object which is actually the ground-contacting object is temporarily determined to be the floating object due to an entry into an occlusion region R, it is extremely likely that the three-dimensional object had been finally determined to be the ground-contacting object before the entry into the occlusion region R. Therefore, the present invention apparatus determines whether the three-dimensional object is the ground-contacting object or the floating object based not only on a result of a temporary determination (that is, a determination based on a lower end height of the three-dimensional object) at the current computation timing, but also on a result of a final determination at the previous computation timing. That is, it is finally determined that the three-dimensional object is the ground-contacting object at the current computation timing when it is determined that the three-dimensional object is the ground-contacting object in at least one of "the temporary determination at the current computation timing" and "the final determination at the previous computation timing". Therefore, according to the present invention apparatus, a possibility that a final determination that the three-dimensional object is the floating object is falsely made can be significantly reduced. As a result, a determination of whether the three-dimensional object is the ground-contacting object or the floating object can be made with a higher accuracy.

Now, according to the above configuration, when a three-dimensional object is temporarily determined to be the ground-contacting object even once at a certain computation timing since the temporary determination and the final determination were started for this three-dimensional object, this object is finally determined to be the ground-contacting object at this computation timing. In this case, even when a temporary determination result that this three-dimensional object is the floating object continues after that, a final determination result that this three-dimensional object is the ground-contacting object will continue. For example, when a three-dimensional object which is actually the floating object temporarily falls onto a road surface for some reason (for instance, wind, own weight thereof, and the like) to be temporarily determined to be the ground-contacting object, even though the temporary determination result that the three-dimensional object is the floating object continues after that, the final determination result that the three-dimensional object is the ground-contacting object will continue. Hence, in a case when the three-dimensional object which is actually the floating object is finally determined to be the ground-contacting object for some reason, it is preferable to reset this final determination result to the floating object.

Therefore, in another aspect of the present invention apparatus, the finally determining means is configured to change a final determination result of the three-dimensional object from a ground-contacting object to a floating object (step 1048) when a temporary determination result that the three-dimensional object is a floating object continues for a predetermined reset time (step 1046: Yes) longer than the computation interval in a case when it is temporarily determined that the three-dimensional object which was finally determined to be a ground-contacting object at a previous computation timing is a floating object at a current computation timing (step 1042: Yes).

According to this configuration, even when a three-dimensional object which is actually the floating object temporarily falls onto a road surface and thereby is falsely determined to be the ground-contacting object, the final determination result of this three-dimensional object is changed from the ground-contacting object to the floating object if the temporary determination result that this three-dimensional object is the floating object continues for the predetermined reset time. Therefore, a possibility that a false determination that the three-dimensional object which is actually the floating object is the ground-contacting object continues to be made can be significantly reduced. As a result, a determination of whether the three-dimensional object is the ground-contacting object or the floating object can be made with a higher accuracy.

In the above description, references used in the following descriptions regarding embodiments are added with parentheses to the elements of the present invention, in order to assist in understanding the present invention. However, those references should not be used to limit the scope of the invention.

DESCRIPTION OF THE EMBODIMENT

Figure 1:
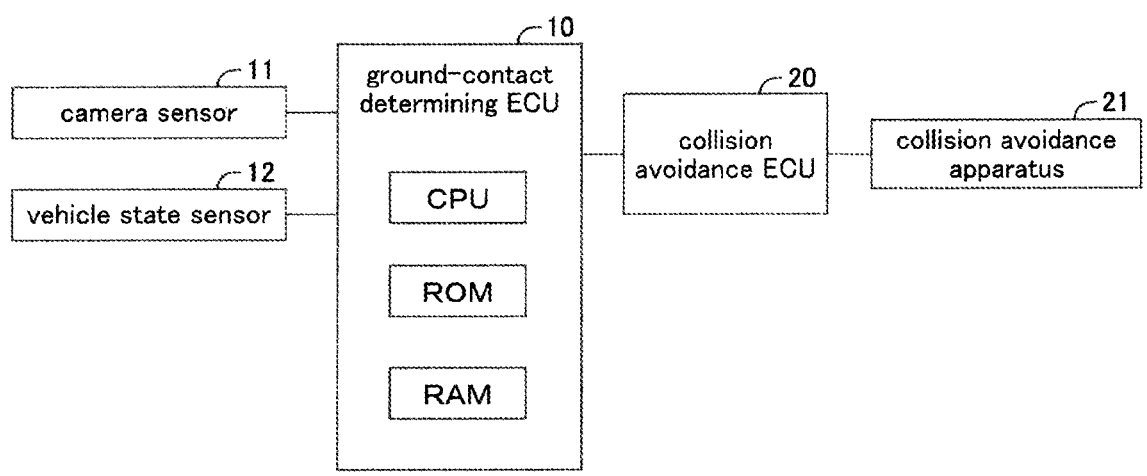
FIG. 1 is a schematic configuration diagram of a three-dimensional object ground-contact determining apparatus (hereinafter, referred to as an "embodiment apparatus") according to an embodiment of the present invention and a collision avoidance control apparatus connected to the embodiment apparatus.

FIG. 1 is a schematic configuration diagram of a three-dimensional object ground-contact determining apparatus (hereinafter, referred to as an "embodiment apparatus") according to an embodiment of the present invention and a collision avoidance control apparatus connected to the embodiment apparatus. The embodiment apparatus and the collision avoidance control apparatus are mounted on a vehicle. Hereinafter, a vehicle on which the embodiment apparatus is mounted is referred to as an "own vehicle" in order to distinguish it from other vehicles. The embodiment apparatus determines whether a three-dimensional object existing in front of the own vehicle is a ground-contacting object which is ground-contacted with a road surface or a floating object floating from a road surface. The ground-contacting object is an object, a lower end thereof being continuous with the road surface in appearance. The ground-contacting object is typically an other vehicle, a pedestrian, a building, a street tree and the like. The floating object is an object, a lower end thereof not being on the road surface in appearance. The floating object is typically a plastic bag, a balloon, and the like.

The embodiment apparatus comprises a ground-contact determining ECU 10, a camera sensor 11, and a vehicle state sensor 12 connected to the ground-contact determining ECU 10. The collision avoidance control apparatus comprises collision avoiding ECU 20 and a collision avoidance control apparatus 21 connected to the collision avoiding ECU 20. The ground-contact determining ECU 10 is connected to the collision avoiding ECU 20 in such a manner that they can mutually exchange data (communicate) via a communication/sensor type of CAN (Controller Area Network). ECU is an abbreviation of "Electric Control Unit" and comprises a microcomputer as a main part. The microcomputer includes CPU and storing devices (non-transitory computer-readable storage medium) such as ROM and RAM. The CPU is configured to realize/perform various functions by executing instructions (i.e., programs or routines) stored in the ROM. Hereinafter, the ground-contact determining ECU 10 is simply referred to as "ECU 10" and the collision avoiding ECU 20 is simply referred to as "ECU 20".

The camera sensor 11 comprises a vehicle-mounted stereo camera apparatus (illustration omitted) for taking an image of a front region of the own vehicle. The vehicle-mounted stereo camera apparatus is provided in a vicinity of a middle in a vehicle width direction of a front edge part of a roof of the own vehicle, and comprises a left camera arranged at a left side from a vehicle front-rear axis and a right camera arranged at a right side from the vehicle front-rear axis. The left camera mainly takes an image of a front left side region of the own vehicle every time a predetermined time elapses to output a left image signal indicating a taken left image to the ECU 10. Similarly, the right camera mainly takes an image of a front right side region of the own vehicle every time a predetermined time elapses to output a right image signal indicating a taken right image to the ECU 10.

The vehicle state sensor 12 is a sensor for acquiring vehicle state information on a travelling state of the own vehicle. The vehicle state sensor 12 includes a vehicle speed sensor for detecting a speed of the own vehicle (that is, a vehicle speed). The vehicle state sensor 12 outputs to the ECU 10 the vehicle state information (vehicle speed) every time the predetermined time elapses.

The ECU 10 generates a parallax image based on a left image signal and a right image signal output from the camera sensor 11. The ECU 10 detects, based on the parallax image, a three-dimensional object existing in front of the own vehicle. Further, the ECU 10 calculates, based on the parallax image, a road surface gradient formula indicating a gradient of a road surface existing in front of the own vehicle. The ECU 10 determines, every time the predetermined time elapses (that is, every time a predetermined computation interval elapses), whether the detected three-dimensional object is the ground-contacting object or the floating object based on a lower end position of the detected three-dimensional object, the road surface gradient formula, and a value of a ground-contact flag which will be described later. The ECU 10 transmits the determination result to the ECU 20. It should be noted that the ECU 10 calculates target object information by a known method, the target object information including a distance between the three-dimensional object and the own vehicle and a direction/orientation of the three-dimensional object with respect to the own vehicle (that is, positional information of the three-dimensional object), a relative speed of the three-dimensional object with respect to the own vehicle and the like, and transmits the calculation result to the ECU 20 along with an ID to identify the three-dimensional object. That is, the ECU 10 can be also said to be target object information acquiring ECU.

The ECU 20 determines whether or not to perform collision avoidance control based on the determination result transmitted from the ECU 10. Here, the collision avoidance control is a control to perform at least one of following controls, that is, a warning control for raising a warning to a driver, an automatic braking control for automatically applying a braking force on the own vehicle, and an automatic steering control for automatically changing a steered angle of a steered wheel of the own vehicle. Each of these controls is performed when there exists a three-dimensional object (strictly, a ground-contacting object) in front of the own vehicle with a possibility of colliding with the own vehicle. When having acquired a final determination result that the three-dimensional object is the ground-contacting object from the ECU 10, the ECU 20 calculates a time-to-collision to the three-dimensional object (a time expected to be required for the own vehicle to collide with this three-dimensional object) from the target object information, vehicle speed of the own vehicle, and the like. Thereafter, when the time-to-collision is less than or equal to a predetermined time threshold, the ECU 20 determines that the own vehicle may collide with this three-dimensional object, and transmits to the collision avoidance apparatus 21 various request signals for collision avoidance which will be described later. On the other hand, when the time-to-collision to the three-dimensional object exceeds the time threshold, the ECU 20 determines that there is no possibility that the own vehicle collides with the three-dimensional object, and does not transmit any request signals for collision avoidance to the collision avoidance apparatus 21 even though the ECU 20 acquires a determination result from the ECU 10 that the three-dimensional object is the ground-contacting object. In addition, when having acquired a determination result from the ECU 10 that the three-dimensional object is the floating object, the ECU 20 determines that this three-dimensional object is not a target of the collision avoidance control, and does not transmit any request signals for collision avoidance to the collision avoidance apparatus 21.

The collision avoidance apparatus 21 includes a warning apparatus, a braking apparatus, a motor driver, and a steering motor connected to the motor driver. The request signals for collision avoidance includes a warning request signal, an automatic braking request signal, and an automatic steering request signal. When the warning request signal is transmitted from the ECU 20, the collision avoidance apparatus 21 operates the warning apparatus to raise a warning to the driver (performs the warning control). In addition, when the automatic braking request signal is transmitted from the ECU 20, the collision avoidance apparatus 21 drives the braking apparatus to adjust an acceleration of the own vehicle (performs the automatic braking control). Further, when the automatic steering request signal is transmitted from the ECU 20, the collision avoidance apparatus 21 drives the motor driver to provide the steering motor with torque, and thereby steers each of the steered wheels (performs the automatic steering control).

According to this configuration, the collision avoidance control will not be performed when it is determined that the three-dimensional object is the floating object, and therefore unnecessary driving support controls is suppressed from being performed, enabling a more proper driving support control.

Operation Detail

Next, operation detail of the embodiment apparatus will be described.

Generation of a Parallax Image

The ECU 10 of the embodiment apparatus generates a parallax image based on the left image signal and the right image signal output from the camera sensor 11 by using a known method (for example, Semi-Global Matching) every time the predetermined time (computation interval) elapses during a period (hereinafter, also referred to as an "engine on period") from a timing at which a non-illustrated engine switch (an ignition key switch) of the own vehicle has been changed into an on state to a timing at which the engine switch is to be changed into an off state. Each of pixels composing the parallax image is associated with parallax information including a parallax thereof. Hereinafter, each of the pixels composing the parallax image is referred to as a "parallax point".

Setting of an Attribution for Each of Blocks in a Parallax Vote Map

Figure 2A:
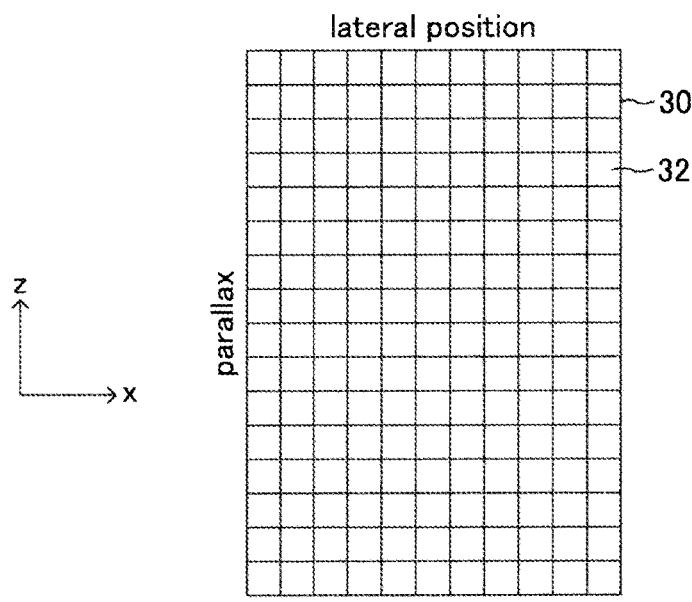
FIG. 2A is a plan view of a parallax vote map.
Figure 2B:
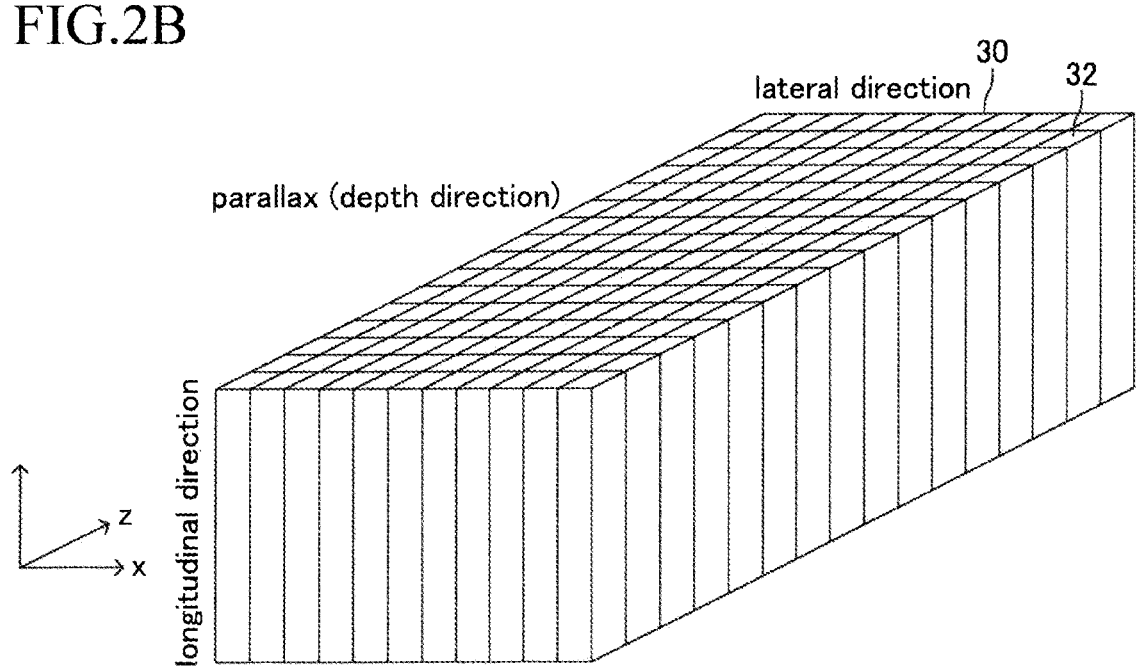
FIG. 2B is a perspective view of the parallax vote map.

FIG. 2A shows a plan view of a parallax vote map 30, and FIG. 2B shows a perspective view of the parallax vote map 30. The parallax vote map 30 is provided in the RAM of the ECU 10. As shown in FIG. 2A and FIG. 2B, the parallax vote map 30 comprises a plurality of rectangular parallelepiped blocks 32 arranged in such a manner that each edge in a lateral direction corresponds to a position in the lateral direction (the vehicle width direction) of the parallax image, each edge in a longitudinal direction corresponds to a position in the longitudinal direction of the parallax image, and each edge in a depth direction corresponds to a magnitude of a parallax. As is already known, a distance in the depth direction (a vehicle front-rear axis direction) becomes larger as a magnitude of a parallax becomes small. The ECU 10 sets, based on the parallax image, any one of following attributes, that is, a three-dimensional object, a road surface, and indistinctness, for each of the blocks 32 of the parallax vote map 30 every time the predetermined time elapses during the engine on period (refer to FIG. 3). A method for setting an attribute is already known and thus hereinafter, one example will be briefly described. For more details, refer to the Japanese Patent Application Laid-Open (kokai) No. 2016-206776 (U.S. Unexamined Patent Application Publication No. 2016305785).

The ECU 10 votes (classifies) each of the parallax points in the parallax image to a corresponding block 32 of the parallax vote map 30 based on a position of each of the parallax points (a position in the lateral direction and a position in the longitudinal direction) and a magnitude of each of parallaxes thereof. Thereafter, the ECU 10 calculates, for each of the blocks 32 of the parallax vote map 30, an average value of the parallaxes, a deviation of the parallaxes, an average value of coordinates of the parallax points in the longitudinal direction of the parallax image, and a deviation of coordinates of the parallax points in the longitudinal direction of the parallax image.

When parallax points, each of which having a parallax (distance) with a similar magnitude, are distributed in a wide range in the longitudinal direction of the parallax image in a block 32 of the parallax vote map 30, the ECU 10 determines that a group of these parallax points indicates a three-dimensional object. In this case, the ECU 10 sets an attribute of a three-dimensional object for this block 32 (refer to FIG. 3). Hereinafter, a block 32 for which an attribute of a three-dimensional object is set may be referred to as a "three-dimensional object block 32a".

On the other hand, when parallax points, each of which having a parallax (distance) with a similar magnitude, are distributed in a narrow range in the longitudinal direction of the parallax image and the positions of these parallax points in the longitudinal direction of the parallax image are smoothly rising as the parallax decreases (that is, as a distance from the own vehicle increases) in a block 32 of the parallax vote map 30, the ECU 10 determines that a group of these parallax points indicates a road surface. In this case, the ECU 10 sets an attribute of a road surface for this block 32 (refer to FIG. 3). Hereinafter, a block 32 for which an attribute of a road surface is set may be referred to as a "road surface block 32b". In contrast, the ECU 10 sets an attribute of indistinctness for a block 32 for which neither attribute, the three-dimensional object nor the road surface is set (refer to FIG. 3). The ECU 10 stores the parallax vote map 30 in which any one of the above three attributes are set for each of the blocks 32 in the RAM in the ECU 10. The parallax vote map 30 stored in the RAM is updated every time the predetermined time elapses.

Transformation Into a Three-Dimensional Coordinate

The ECU 10 transforms, every time the predetermined time elapses during the engine on period, a parallax point classified as the three-dimensional object block 32a (hereinafter, may be referred to as a "three-dimensional object parallax point") and a parallax point classified as the road surface block 32b (hereinafter, may be referred to as a "road surface parallax point") to a three-dimensional coordinate (z, x, y) in accordance with following equations (1) to (3). Herein, z, x, y denote a component in the depth direction (the vehicle front-rear axis direction), a component in the lateral direction (the vehicle width direction), and a component in a height direction, respectively. It should be noted that this height direction corresponds to the longitudinal direction of the parallax image and the parallax vote map 30. In addition, in the following equations, B denotes a distance between the left camera and the right camera of the camera sensor 11, f denotes a focal distance of these cameras, d denotes a parallax included in parallax information associated with a parallax point, and u, v denote a component in the lateral direction and a component in the longitudinal direction of a coordinate of a parallax point in the parallax image, respectively.

$$z = B \cdot f / d \quad (1)$$

$$x = u \cdot f / z \quad (2)$$

$$y = v \cdot f / z \quad (3)$$

The ECU 10 groups (gathers) a group of three-dimensional coordinates of three-dimensional object parallax points out of the parallax points for each three-dimensional object block 32a to store in the RAM. The three-dimensional coordinate of each of the parallax points stored in the RAM is updated every time the predetermined time elapses (every time a computation timing arrives). However, a three-dimensional coordinate of a three-dimensional object parallax point updated at a previous computation timing will be used for a tracking process of a three-dimensional object as will be described later, and therefore this three-dimensional coordinate is separately stored in the RAM of the ECU 10 until each processing at a current computation timing is finished.

Coupling of Three-Dimensional Object Blocks

Figure 3:
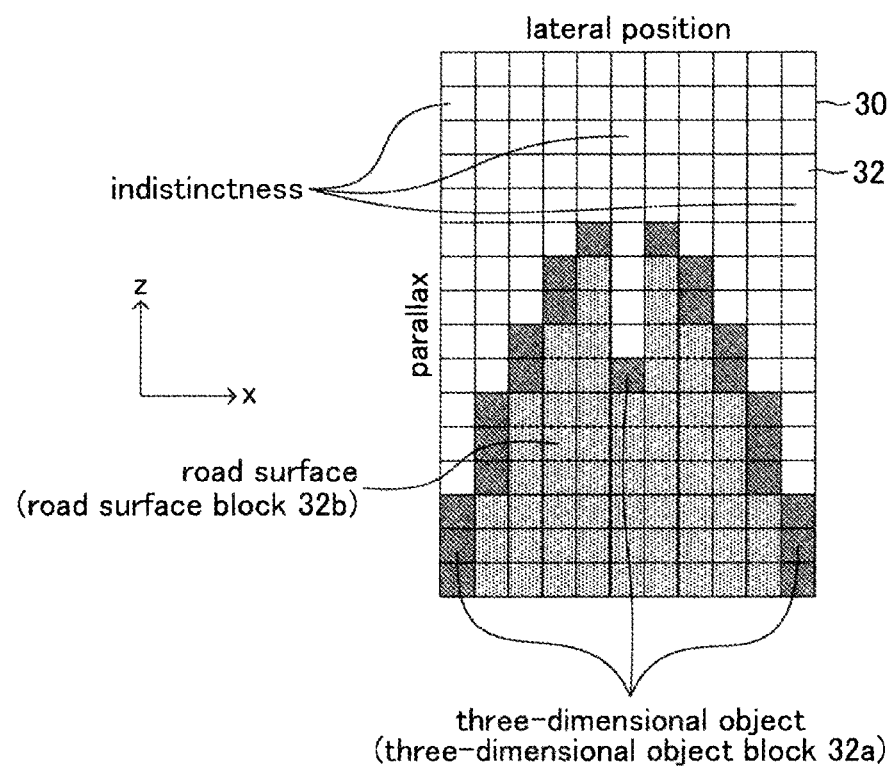
FIG. 3 is a diagram showing a parallax vote map where an attribute is set for each block.

When three-dimensional object blocks 32a are adjacent to each other in the parallax vote map 30, the ECU 10 determines whether these three-dimensional objects constitute one continuous three-dimensional object or are individual three-dimensional objects. This determination is made every time the predetermined time elapses during the engine on period. Specifically, as shown in FIG. 3, when a three-dimensional object block(s) 32a exists among eight blocks 32, each of which being adjacent to a certain three-dimensional object block 32a, the ECU 10 calculates a distance on a z-x plane between "a three-dimensional object parallax point classified into one three-dimensional object block 32a" and "a three-dimensional object parallax point classified into an other three-dimensional object block 32a". Thereafter, the ECU 10 determines whether a minimum value of this distance is less than or equal to a predetermined coupling distance threshold. When this minimum value is less than or equal to the coupling distance threshold, the ECU 10 determines that the three-dimensional object corresponding to the one three-dimensional object block 32a and the three-dimensional object corresponding to the other three-dimensional object block 32a are one continuous three-dimensional object and couples these two three-dimensional object blocks 32a. On the other hand, when the minimum value exceeds the coupling distance threshold, the ECU 10 determines that the three-dimensional object corresponding to the one three-dimensional object block 32a and the three-dimensional object corresponding to the other three-dimensional object block 32a are individual three-dimensional objects and does not couple these two three-dimensional object blocks 32a.

Figure 4:
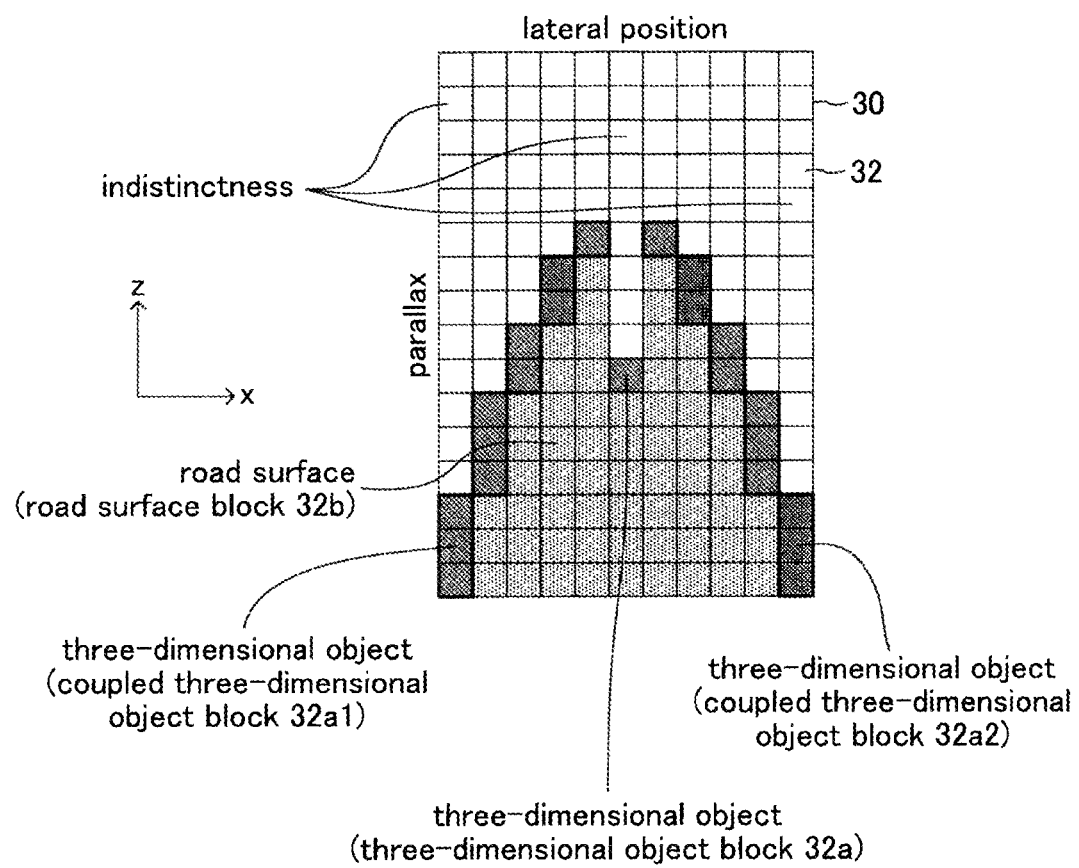
FIG. 4 is a diagram showing the parallax vote map where three-dimensional object blocks are coupled.

The ECU 10 performs the above processing for all the three-dimensional object blocks 32a. Hereinafter, three-dimensional object blocks 32a, each of which being coupled with each other will be collectively referred to as a "coupled three-dimensional object block 32a". FIG. 4 illustrates an example of having performed the coupling processing of three-dimensional objects for all the three-dimensional object blocks 32a shown in FIG. 3. In this example, three-dimensional object blocks 32a, each of which being adjacent to each other at a left side of the parallax vote map 30 are coupled to form one coupled three-dimensional object block 32a1. In addition, three-dimensional object blocks 32a, each of which being adjacent to each other at a right side of the parallax vote map 30 are coupled to form one coupled three-dimensional object block 32a2. When a plurality of three-dimensional object blocks 32a are coupled with each other, the ECU 10 groups "a group of the three-dimensional coordinates of the three-dimensional object parallax points, each group of which being grouped for every three-dimensional object block 32a" for every coupled three-dimensional object block 32a to store the RAM of the ECU 10. In other words, the ECU 10 expands a group of the three-dimensional coordinates of the three-dimensional object parallax points from a group for every three-dimensional object block 32a to a group for every coupled three-dimensional object block 32a. Each of grouped groups of the three-dimensional coordinates constitutes one three-dimensional object. Thereby, a three-dimensional object existing in front of the own vehicle is detected.

Calculation of a Road Surface Gradient Formula

Figure 5:
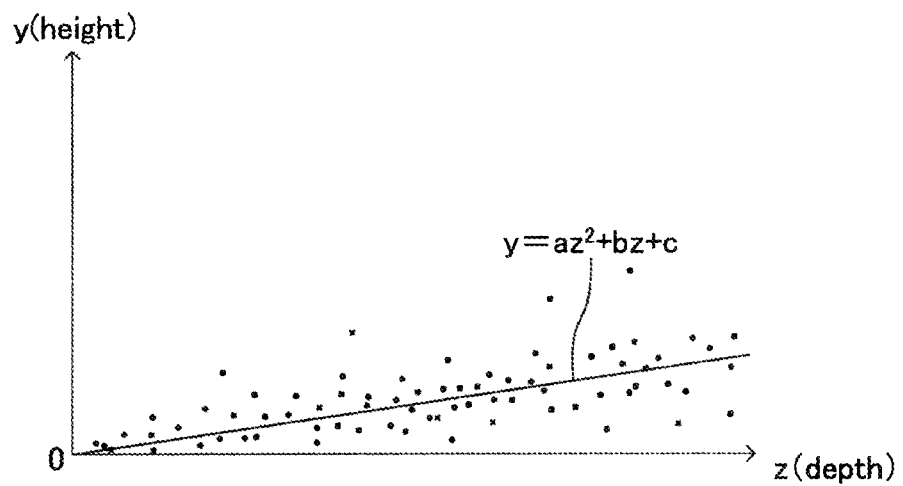
FIG. 5 is a graph defining a relationship between a distance in a depth direction (z direction) and a distance in a height direction (y direction) of each of road surface parallax points when a position of a vehicle is set as a reference, and is a diagram showing a road surface gradient formula acquired by approximating a group of points on the graph by a quadratic function.

The ECU 10 calculates a road surface gradient formula indicating a gradient of a road surface existing in front of the own vehicle by means of a known method every time the predetermined time elapses during the engine on period. Specifically, as shown in FIG. 5, the ECU 10 generates a graph defining a relationship between a distance in the depth direction (z direction) and a distance in the height direction (y direction) of each of the road surface parallax points when a position of the own vehicle is set as a reference. In this graph, a lateral axis represents the z direction and a longitudinal axis represents the y direction. This graph is generated by plotting z components and y components of coordinates of all of the road surface parallax points in the parallax vote map 30. After plotting the road surface parallax points on the graph, the ECU 10 approximates, by using M estimation of least-squared method, a group of the points on the graph by a quadratic function ($y = a \cdot z^2 + b \cdot z + c$. A, b, and c are constant values calculated by the M estimation.) and calculates this approximated formula as a road surface gradient formula. It should be noted that as is obvious from the aforementioned description, a road surface gradient formula is a formula determined based on a z component (a component in the depth direction) and a y component (a component in the height direction) of a coordinate of each of the road surface parallax points, and an x component (a component in the lateral direction) is not considered. That is, a road surface gradient formula is generated on a premise that "heights of a road surface at positions with same distances in the depth direction are substantially constant in the lateral direction". Therefore, a configuration where the x component is not calculated when transforming a road surface parallax point into a three-dimensional coordinate may be adopted. It should be noted that a method for approximating a group of the points on the graph is not limited to the M estimation, but for example, L estimation or R estimation may be used, or methods other than the least-squared method may be used. The ECU 10 stores the calculated road surface gradient formula in the RAM thereof.

Temporary Determination of Whether or Not a Three-Dimensional Object at a Current Computation Timing is the Ground-Contacting Object The ECU 10 temporarily determines whether a three-dimensional object is the ground-contacting object or the floating object at a "current computation timing" every time the predetermined time elapses during the engine on period. Hereinafter, this processing of temporarily determining will be also referred to as a "temporary determination". Specifically, first, the ECU 10 calculates a coordinate (zL, xL, yL) of a lower end position of the three-dimensional object as follows. That is, when the three-dimensional object block 32a is not coupled to any blocks 32, the ECU 10 calculates a coordinate (z, x, y) of a three-dimensional object parallax point with a minimum y coordinate among three-dimensional object parallax points classified into this three-dimensional object block 32a as a coordinate (zL, xL, yL) of the lower end position of the three-dimensional object. On the other hand, when the three-dimensional object block 32a is coupled to an other adjacent three-dimensional object block(s) 32a, the ECU 10 calculates a coordinate (z, x, y) of a three-dimensional object parallax point with a minimum y coordinate among all three-dimensional object parallax points classified into the coupled three-dimensional object blocks 32a as a coordinate (zL, xL, yL) of the lower end position of the three-dimensional object. It should be noted that when there exist a plurality of three-dimensional object parallax points, each of which having a same height yL of a lower end position, the ECU 10 selects one among these three-dimensional object parallax points and calculates a coordinate of the selected three-dimensional object parallax point as a coordinate of the lower end position of the three-dimensional object. In the present embodiment, the ECU 10 selects, among a plurality of three-dimensional object parallax points, each of which having a same height yL of the lower end position, a three-dimensional object parallax point, a depth zL of the lower end position thereof being minimum. The ECU 10 stores a calculated coordinate of the lower end position of the three-dimensional object in the RAM.

Next, the ECU 10 calculates a height h of the lower end position of the three-dimensional object from a road surface (Hereinafter, this height will be also referred to as a "lower end height h"). The lower end height h is calculated in accordance with a following equation (4).

$$h = yL - (a \cdot zL^2 + b \cdot zL + c) \quad (4)$$

That is, the lower end height h is calculated by subtracting, from the height yL of the lower end position of the three-dimensional object, a height of a road surface at the depth zL of the lower end position (that is, a value obtained by substituting the depth zL of the lower end position of the three-dimensional object for the road surface gradient formula $y = a \cdot z^2 + b \cdot z + c$). Subsequently, the ECU 10 determines, for each of all the three-dimensional objects detected at the current computation timing, whether or not the lower end height h thereof is less than or equal to a predetermined height threshold. When the lower end height h is less than or equal to the height threshold, the ECU 10 makes a temporary determination that the three-dimensional object is the ground-contacting object "at the current computation timing". When the lower end height h exceeds the height threshold, the ECU 10 makes a temporary determination that the three-dimensional object is the floating object "at the current computation timing". The ECU 10 stores a temporary determination result which is a result of the temporary determination in the RAM of the ECU 10.

It should be noted that there may be a case where the lower end height h has a value greater than zero due to an error of the lower end position, an error of the road surface gradient formula, or the like even though the three-dimensional object is actually ground-contacted with a road surface. Therefore, the height threshold is set to be a value slightly greater than zero based on an experiment, a simulation, and the like.

Further, a coordinate of a lower end position of a coupled three-dimensional object block 32a may be calculated as follows. That is, the ECU 10 may calculate a coordinate of a lower end position of each of the three-dimensional object blocks 32a constituting the coupled three-dimensional object block 32a, and thereafter may calculate a coordinate of a three-dimensional object parallax point with a minimum yL among them as a coordinate of the lower end position of the coupled three-dimensional object block 32a.

Setting of a Ground-Contact Flag and Tracking of a Three-Dimensional Object

Figure 6:
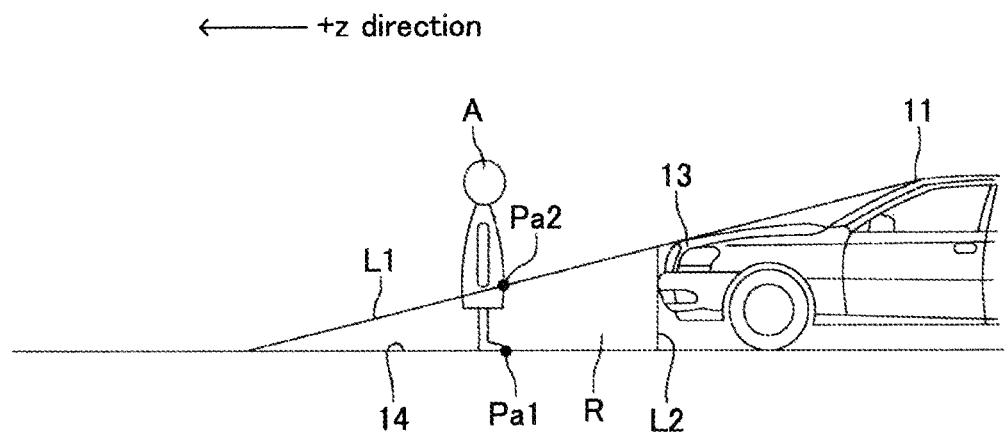
FIG. 6 is a diagram showing an occlusion region generated because imaging areas of left and right cameras are blocked by a hood of the vehicle and showing a difference between "an actual lower end position of a three-dimensional object which is a ground-contacting object" and "a lower end position calculated by the embodiment apparatus" in a case when the three-dimensional object exists in the occlusion region.

Although the ECU 10 is configured to detect a three-dimensional object existing in front of the own vehicle based on the left and right image signals taken by the left and right cameras, there exists a region in front of the own vehicle, the region being not included in the imaging areas of the left and right cameras. This region is inevitably generated, for example, due to a limitation of an angle of view of each of the left and right cameras and/or because the imaging areas of the left and right cameras are blocked by a hood (bonnet) of the own vehicle. Hereinafter, this region will be referred to as an "occlusion region R". FIG. 6 shows the occlusion region R in a side view, the region R being generated because the imaging areas of the left and right cameras are blocked by the hood 13 of the own vehicle. The occlusion region R is a region surrounded by a straight line L1 connecting a installation position of the camera sensor 11 and a corner part of the hood 13, a road surface 14, and a straight line L2 passing through a front edge part of the own vehicle as well as perpendicular to the road surface 14. When a three-dimensional object A who is ground-contacted with the road surface 14 exists in the occlusion region R, a part of the three-dimensional object A, the part being positioned in the occlusion region R is not included in the imaging areas. Therefore, the ECU 10 calculates, as a lower end position of the three-dimensional object A, a lower end position Pa2 of "a part of the three-dimensional object A, the part being positioned above the occlusion region R", not an actual lower end position Pa1 of the three-dimensional object A. As a result, the lower end height h is calculated as a value larger than the actual value, and therefore when this lower end height h exceeds the height threshold, the ECU 10 makes a temporary determination that the three-dimensional object A is the floating object in spite of the object A actually being the ground-contacting object.

Hence, the ECU 10 makes a final determination of whether the three-dimensional object is the ground-contacting object or the floating object based not only on the temporary determination result at the current computation timing but also on a final determination result at a previous (strictly, immediately previous) computation timing. For example, when it was finally determined that the three-dimensional object was the ground-contacting object at the previous computation timing, the ECU 10 makes a final determination that the three-dimensional object is the ground-contacting object at the current computation timing even though the ECU 10 makes a temporary determination that the three-dimensional object is the floating object at the current computation timing.

Specifically, when having made a final determination that the three-dimensional object is the ground-contacting object at a certain computation timing, the ECU 10 set a value of a ground-contact flag for this three-dimensional object to "1". In contrast, when having made a final determination that the three-dimensional object is the floating object at a certain computation timing, the ECU 10 set a value of the ground-contact flag for this three-dimensional object to "0". Thereafter, at a subsequent (strictly, immediately subsequent) computation timing, ECU 10 makes a final determination of whether or not this three-dimensional object is the ground-contacting object or the floating object by referring to the value of this ground-contact flag. In order to refer to the value of the ground-contact flag as stated above, the ECU 10 identifies which of three-dimensional objects detected at the previous computation timing the three-dimensional object detected at the current computation timing corresponds to. That is, the ECU 10 tracks the three-dimensional object. The ECU 10 tracks the three-dimensional object based on the lower end positions of all the three-dimensional objects detected at the previous computation timing, the lower end position of the three-dimensional object for which the above determination is to be performed at the current computation timing, and the vehicle speed of the own vehicle. It should be noted that the three-dimensional object is tracked by using the parallax vote map 30, and therefore strictly speaking, the ECU 10 tracks the three-dimensional object block.

Figure 7:
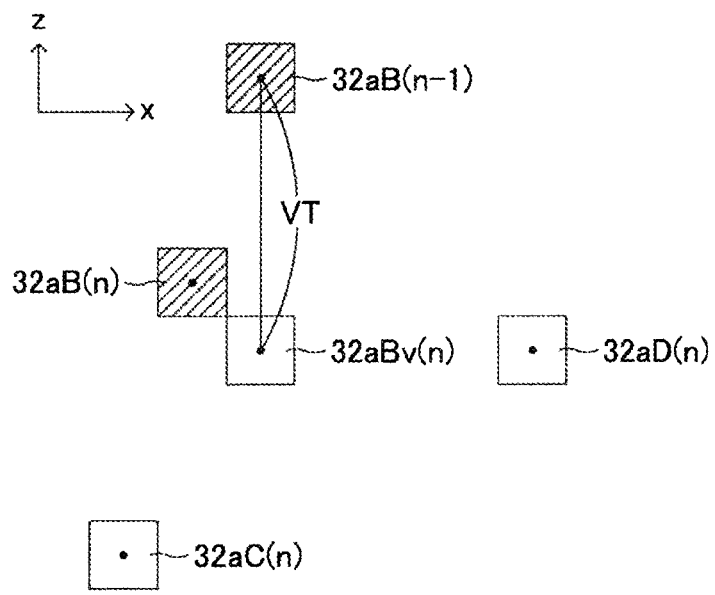
FIG. 7 is a diagram used to describe a method for tracking a three-dimensional object block.

A method for tracking the three-dimensional object block 32a will be described, referring to FIG. 7. FIG. 7 shows a diagram where only three-dimensional object blocks 32a are extracted from the parallax vote map 30 generated at an nth (n≥2) computation timing when the current computation timing is defined as the nth timing. Hereinafter, a three-dimensional object block 32a corresponding to a three-dimensional object X at the nth computation timing will be denoted as a three-dimensional object block 32aX(n). In the present example, there exist three three-dimensional object blocks 32aB(n), 32aC(n), and 32aD(n), each of which corresponding to a three-dimensional object B, C, and D. The ECU 10 stores a coordinate of a lower end position of the three-dimensional object block 32aB(n-1) at an n-1th computation timing (that is, a previous (immediately previous) computation timing). In FIG. 7, this three-dimensional object block 32aB(n-1) is depicted as well in a superimposed manner for convenience of the description.

Let us define an interval from the n-1th computation timing to the nth computation timing as T. In this case, when the own vehicle travels forward (+z direction, an upper direction in FIG. 7) at a vehicle speed V, the own vehicle progresses/travels by a distance V·T in the +z direction during the interval (an immediately previous one interval) from the n-1th computation timing to the nth computation timing. Therefore, the lower end position of each of the three-dimensional object blocks 32a relatively moves in the −z direction (a lower direction in FIG. 7) by a length corresponding to the travelling distance V·T of the own vehicle during the interval from the n-1th computation timing to the nth computation timing even though the three-dimensional object corresponding to each of the three-dimensional object blocks 32a is at rest. Hence, the ECU 10 estimates "a position to which the lower end position of each of the three-dimensional object blocks 32a at the n-1 computation timing is horizontally moved in the −z direction by the length of V·T" as a position at the nth computation timing in a case when each of the three-dimensional object blocks 32a is assumed to be at rest for immediate one interval. Thereafter, the ECU 10 sets to this estimated position "a virtual three-dimensional object block 32av at the nth computation timing corresponding to each of the three-dimensional object blocks 32a".

In the example of FIG. 7, the lower end position of the three-dimensional object block 32aB(n-1) at the n-1th computation timing is horizontally moved to by the length of V·T in the −z direction and as a result "a virtual three-dimensional object block 32aBv(n) at the nth computation timing" corresponding to the three-dimensional object block 32aB(n-1) is set.

Now, the computation interval T is an infinitesimal time, and thus a moving distance of a three-dimensional object is extremely small even though this object has a nonzero speed. Therefore, it can be considered that a three-dimensional object block 32aX(n) of some three-dimensional object X is positioned closer to a virtual three-dimensional object block 32avX(n) compared to a three-dimensional object block 32aY(n) of an other three-dimensional object Y. Therefore, the ECU 10 calculates a distance on a horizontal plane (that is, a distance on a z-x plane) between the lower end position of the virtual three-dimensional object block 32avX(n) and the lower end position of each of all the three-dimensional object blocks at the nth computation timing. Thereafter, the ECU 10 determines, among them, a three-dimensional object block with a minimum distance as a "three-dimensional object block 32aX(n) at the nth computation timing".

In the example of FIG. 7, the ECU 10 calculates a distance on the horizontal plane between the lower end position of the virtual three-dimensional object block 32aBv(n) and each of the lower end positions of the three-dimensional object blocks 32aB(n), 32aC(n), and 32aD(n) at the nth period. As is obvious from FIG. 7, among these distances, a distance between the lower end position of the virtual three-dimensional object block 32aBv(n) and the lower end position of the three-dimensional object block 32aB(n) is minimum. Therefore, the ECU 10 associates the three-dimensional object block 32aB(n) with the three-dimensional object block 32aB(n-1).

In this way, the ECU 10 identifies (tracks) which of the three-dimensional objects detected at the n-1th computation timing the three-dimensional object detected at the nth computation timing corresponds to. A similar method for tracking is applied to coupled three-dimensional object blocks 32a. Tracking a three-dimensional object enables the ECU 10 to acquire (refer to) a value of a ground-contact flag for the tracked three-dimensional object. That is, the ECU 10 can recognize which one of the ground-contacting object and the floating object the "three-dimensional object to be focused on" at the nth computation timing had been finally determined to be at the n-1th computation timing.

Final Determination of Whether or Not a Three-Dimensional Object at the Current Computation Timing is the Ground-Contacting Object As mentioned above, when having temporarily determined that "a certain three-dimensional object" is the ground-contacting object at the current computation timing, the ECU 10 makes a final determination that this three-dimensional object is the "ground-contacting object" and sets a value of a ground-contact flag of this three-dimensional object to "1" regardless of a value of the ground-contact flag of this three-dimensional object (that is, regardless of a final determination result at the previous computation timing).

In contrast, when having temporarily determined that "a certain three-dimensional object" is the floating object at the current computation timing, the ECU 10 makes a final determination that this three-dimensional object is the "ground-contacting object" and sets a value of a ground-contact flag of this three-dimensional object to "1" when a value of the ground-contact flag of this three-dimensional object is "1" (that is, when a final determination result at the previous computation timing is the "ground-contacting object").

Further, when having temporarily determined that "a certain three-dimensional object" is the floating object at the current computation timing, the ECU 10 makes a final determination that this three-dimensional object is the "floating object" and sets a value of a ground-contact flag of this three-dimensional object to "0" when a value of the ground-contact flag of this three-dimensional object is "0" (that is, when a final determination result at the previous computation timing is the "floating object").

Figure 8:
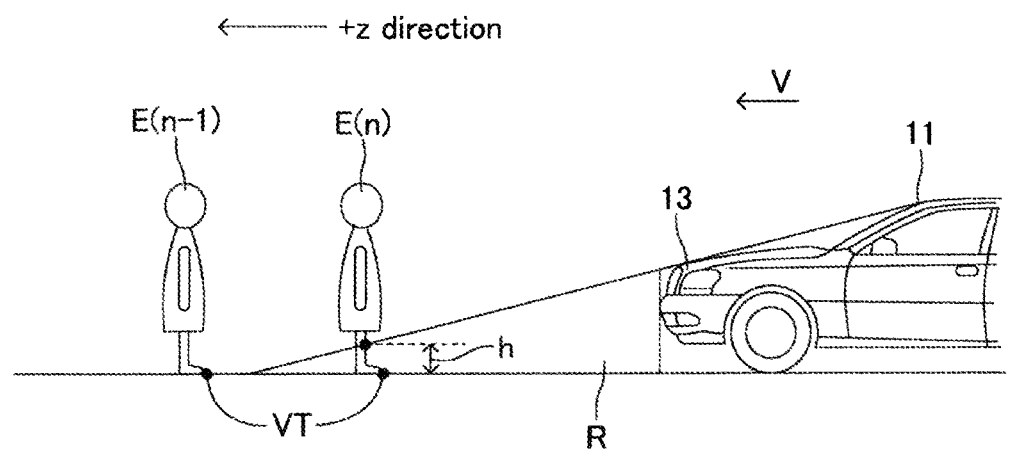
FIG. 8 is a diagram showing a positional relationship between the three-dimensional object (the ground-contacting object) and the vehicle at an n-1th period and at an nth period when the vehicle is approaching the three-dimensional object positioned in a +z direction with respect to the vehicle.

As a result, a possibility that the ground-contacting object is falsely determined to be the floating object can be reduced. A description will be made in this regard, referring to FIG. 8. FIG. 8 shows a positional relationship between a three-dimensional object E and the own vehicle at the n-1th and the nth computation timings when the own vehicle is approaching the three-dimensional object E at the vehicle speed V, the object E being positioned in the +z direction with respect to the own vehicle. The three-dimensional object E is ground-contacted with a road surface and is at rest. Hereinafter, a three-dimensional object E at the nth computation timing will be denoted as E(n). Although the three-dimensional object E(n-1) is positioned outside the occlusion region R at the n-1th computation timing, the three-dimensional object E(n) at the nth computation timing is positioned inside the occlusion region R by relatively approaching the own vehicle by the length of V·T. A lower end height h of "a part of the three-dimensional object E(n), the part being positioned above the occlusion region R" is assumed to exceed the height threshold.

In this case, the ECU 10 makes a temporary determination that the three-dimensional object E is the "ground-contacting object" at the n-1th computation timing, and thus the ECU 10 makes a final determination that the three-dimensional object E is the "ground-contacting object" regardless of a value of a ground-contact flag of the three-dimensional object E (that is, a final determination result at an n-2th computation timing of the three-dimensional object E). Hence, the ECU 10 sets a value of the ground-contact flag to "1". Thereafter, although the ECU 10 makes a temporary determination at the nth computation timing that the three-dimensional object E is the "floating object", the ECU 10 makes a final determination at the nth computation timing that the three-dimensional object E is the "ground-contacting object" since the value of the ground-contact flag at the n-1th computation timing is set to "1". Accordingly, the ECU 10 sets a value of the ground-contact flag of the three-dimensional object E to "1". As a result, a possibility that this ground-contacting object is falsely determined to be the floating object even when the ground-contacting object enters the occlusion region R can be significantly reduced.

Reset of a Final Determination Result (a Ground-Contact Flag)

According to the aforementioned method, when at least one of a temporary determination result at the nth computation timing for a certain three-dimensional object and a final determination result at the n-1th computation timing for this three-dimensional object is the "ground-contacting object", the ECU 10 makes a final determination that this three-dimensional object is the ground-contacting object at the nth computation timing. Therefore, once it is temporarily determined that a three-dimensional object is the ground-contacting object at a certain computation timing, even though temporary determinations that this three-dimensional object is the floating object continue to be made at subsequent computation timings, a final determination that this three-dimensional object is the ground-contacting object continues. Therefore, if a temporary determination that the floating object is the ground-contacting object is falsely made, it is highly likely that the collision avoidance control will be performed for the floating object for which the collision avoidance control is essentially unnecessary.

Figure 9:
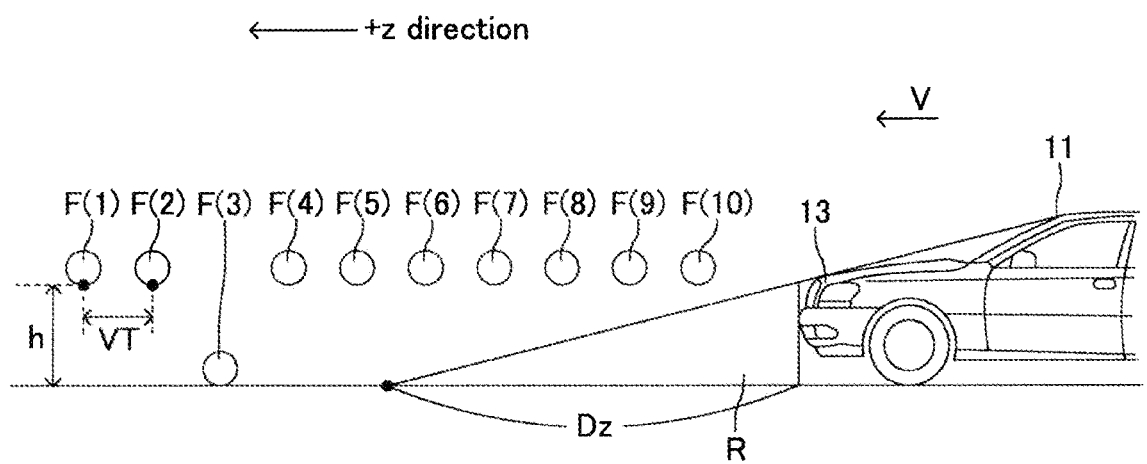
FIG. 9 is a diagram showing a positional relationship between the three-dimensional object and the vehicle at a first to a tenth periods when the vehicle is approaching the three-dimensional object positioned in a +z direction with respect to the vehicle.

A specific description will be made about a case where such a situation occurs, referring to FIG. 9 and a following table 1. FIG. 9 shows a positional relationship between a three-dimensional object F and the own vehicle at the 1st through the 10th computation timings when the own vehicle is approaching the three-dimensional object F at the vehicle speed V, the object F being positioned in the +z direction with respect to the own vehicle. A table 1 shows temporary determination results and final determination results of the three-dimensional object F at the 1st through the 10th computation timings, respectively. "F" and "G" in the table 1 represent the "floating object" and the "ground-contacting object", respectively. Hereinafter, a position of the three-dimensional object F at the nth computation timing will be denoted as F(n). In this example, the three-dimensional object F is the floating object and has been at rest at "a position, a lower end height h thereof being greater than the height threshold" except at the 3rd computation timing. The three-dimensional object F temporarily falls onto a road surface at the 3rd computation timing for some reason (for instance, wind, own weight thereof, and the like). Positions F(n+1) (n: 1 through 9) relatively moves toward the own vehicle with respect to positions F(n) by the length of V·T.

TABLE 1

| n | 1 | 2 | 3 | 4 | 5 | 6 | 7 | 8 | 9 | 10 |
|---|---|---|---|---|---|---|---|---|---|---|
| Temporary determination result | F | F | G | F | F | F | F | F | F | F |
| Final determination result | F | F | G | G | G | G | G | G | G | G |

The three-dimensional object F is the floating object, and thus it is desired that a final determination that the three-dimensional object F is the "floating object" is made at any periods. However, as shown in the table 1, a temporary determination that the three-dimensional object F is the ground-contacting object is made at the 3rd computation timing because the three-dimensional object F temporarily falls onto the road surface and therefore the three-dimensional object F is determined to be the ground-contacting object at the 3rd computation timing. As a result, a final determination that the three-dimensional object F is the ground-contacting object continues to be made even though temporary determinations that the three-dimensional object F is the floating object continue to be made at the subsequent computation timings.

Thus, when a three-dimensional object which was finally determined to be the ground-contacting object is temporarily determined to be the floating object at a subsequent computation timing, the ECU 10 measures a time (a floating object determination continuation time) during which a temporary determination that the three-dimensional object is the floating object continues to be made. Thereafter, when the floating object determination continuation time reaches a predetermined reset time, the ECU 10 determines that the three-dimensional object is actually the floating object and makes a final determination that the three-dimensional object is the floating object at a point in time when the reset time has elapsed. It should be noted that the reset time may be calculated by an experiment or a simulation.

For example, in the example of FIG. 9, assume that the reset time is set to be a time five times longer than the computation interval (5·T). In this case, a temporary determination that the three-dimensional object F is the floating object continues to be made during a time from the 4th computation timing to the 9th computation timing (that is, a time taken for the floating object determination continuation time to reach a time of five periods (5·T)), the 4th computation timing being the subsequent computation timing of the 3rd computation timing at which the three-dimensional object F was finally determined to be the ground-contacting object. Therefore, as shown in the table 2, a final determination that the three-dimensional object F is the floating object is made at the 9th computation timing. Thereby, a possibility that the floating object continues to be falsely determined to be the ground-contacting object can be reduced and a possibility that an unnecessary collision avoidance control is performed can be reduced.

TABLE 2

| n | 1 | 2 | 3 | 4 | 5 | 6 | 7 | 8 | 9 | 10 |
|---|---|---|---|---|---|---|---|---|---|---|
| Temporary determination result | F | F | G | F | F | F | F | F | F | F |
| Final determination result | F | F | G | G | G | G | G | G | F | F |

It should be noted that when a certain three-dimensional object is determined to be the ground-contacting object by the embodiment apparatus and that the time-to-collision to this three-dimensional object is determined to be less than or equal to a predetermined time threshold by the collision avoidance control apparatus, the collision avoidance control apparatus initiates the collision avoidance control against this three-dimensional object. In this case, even though the floating object determination continuation time of this three-dimensional object has reached the reset time afterwards, the embodiment apparatus does not change a final determination result for this three-dimensional object to the floating object, but maintains the final determination result that this three-dimensional object is the ground-contacting object. Accordingly, the collision avoidance control against this three-dimensional object is properly performed even though the floating object determination continuation time of this object has reached the reset time after the collision avoidance control was initiated.

Actual Operation

Next, an actual operation of the ECU 10 will be described. The CPU of the ECU 10 is configured to perform, during the engine on period, routines shown by flowcharts of FIG. 10 and FIG. 11 every time the predetermined time (the computation interval) elapses.

Figure 10:
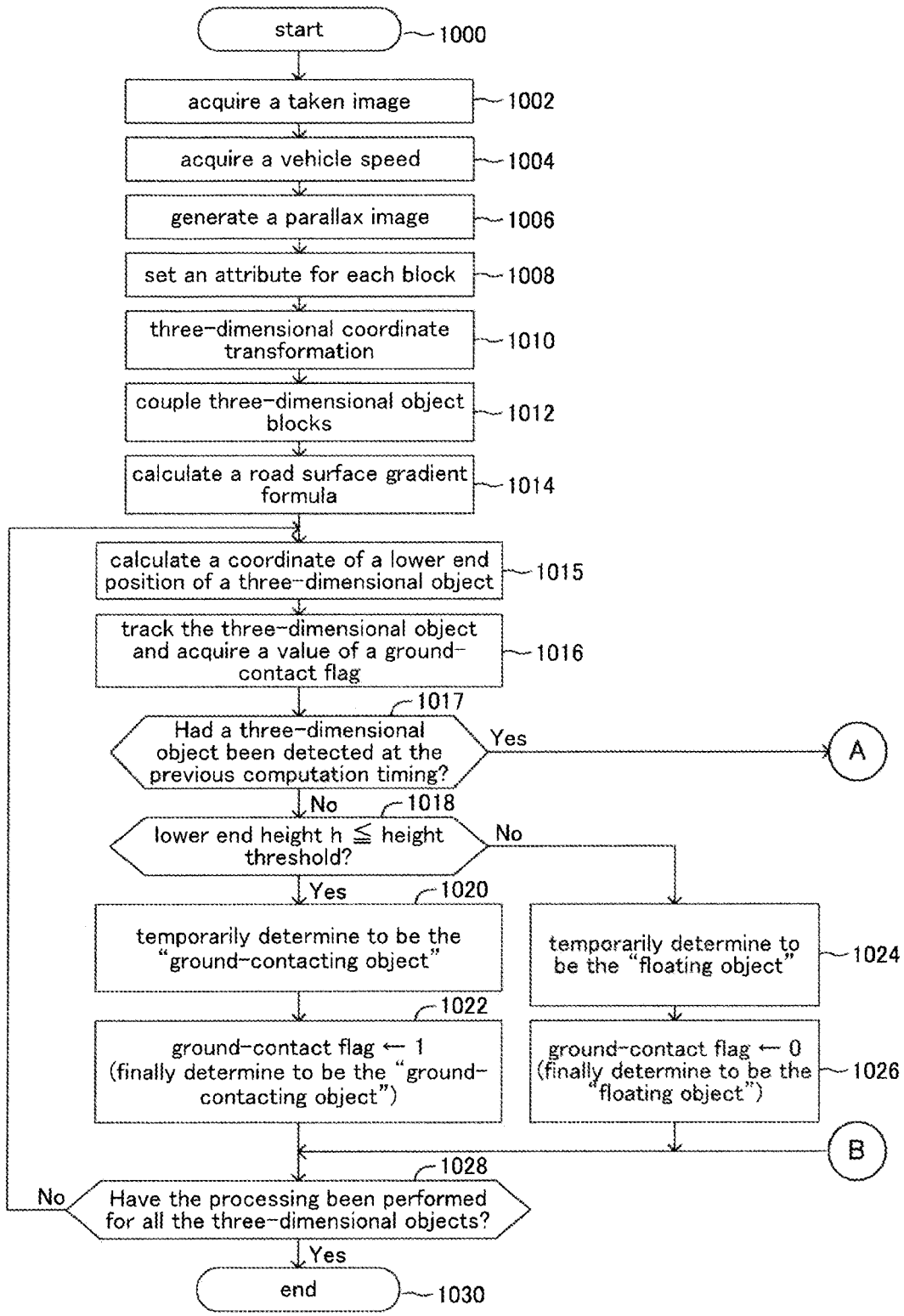
FIG. 10 is a flowchart (part 1) showing a routine performed by CPU of ground-contact determining ECU of the embodiment apparatus (hereinafter, referred to as "CPU of the embodiment apparatus").

When the engine switch is changed to the on state, the CPU starts processing from a step 1000 in FIG. 10 and performs processing of following steps 1002 to 1016 in order.

Step 1002: the CPU receives a left image signal and a right image signal from the camera sensor 11. That is, the CPU acquires a taken image including a left image and a right image.

Step 1004: the CPU acquires a vehicle speed from the vehicle state sensor 12.

Step 1006: the CPU generates a parallax image from the taken image.

Step 1008: the CPU writes any one of three attributes (a three-dimensional object, a road surface, or an indistinctness) in each of the blocks 32 of the parallax vote map 30 based on parallax information included in the parallax image.

Step 1010: the CPU transforms following parallax points into three-dimensional coordinates (z, x, y) based on the attribute of each of the blocks 32, the parallax points being three-dimensional object parallax points which are parallax points classified into the three-dimensional object block 32a and road surface parallax points which are parallax points classified into the road surface block 32b.

Step 1012: the CPU determines, based on the coordinates of the three-dimensional object parallax points transformed into the three-dimensional coordinates at the step 1010, whether adjacent three-dimensional object blocks 32a constitute one continuous three-dimensional object or are individual three-dimensional objects. When having determined that the adjacent three-dimensional object blocks 32a constitute one continuous three-dimensional object, the CPU couples these three-dimensional object blocks 32a to generate a coupled three-dimensional object block 32a and groups a group of three-dimensional coordinates of three-dimensional object parallax points included in this coupled three-dimensional object block 32a. On the other hand, when having determined that the adjacent three-dimensional object blocks 32a are individual three-dimensional objects, the CPU does not couple these three-dimensional object blocks 32a but groups a group of three-dimensional coordinates of three-dimensional object parallax points included in each of the three-dimensional object blocks 32a. Thereby, three-dimensional objects existing in front of the own vehicle are detected.

Step 1014: the CPU calculates a road surface gradient formula of a road surface existing in front of the own vehicle based on the coordinates of the road surface parallax points transformed into three-dimensional coordinates at the step 1010.

Step 1015: the CPU calculates, for one three-dimensional object among the three-dimensional objects detected at the step 1012, a coordinate (zL, xL, yL) of a lower end position of this three-dimensional object based on the coordinates of the three-dimensional object parallax points transformed into three-dimensional coordinates at the step 1010. Hereinafter, this three-dimensional object will be referred to as a "target three-dimensional object".

Step 1016: the CPU tracks which of the three-dimensional objects detected at the previous computation timing the target three-dimensional object corresponds to, and acquires a value of a ground-contact flag set for the tracked three-dimensional object (that is, acquires a final determination result at the previous computation timing).

Subsequently, the CPU proceeds to a step 1017 to determine whether or not the CPU succeeded in tracking the target three-dimensional object at the step 1016 (that is, determine whether or not a three-dimensional object corresponding to the target three-dimensional object had been detected at the previous computation timing). When having determined that the CPU did not succeed in tracking the target three-dimensional object, the CPU makes a "No" determination at the step 1017 (that is, determines that the target three-dimensional object has been detected for a first time at the current computation timing) to proceed to a following step 1018.

At the step 1018, the CPU calculates a lower end height h (refer to the equation (4)) of the target three-dimensional object based on the road surface gradient formula calculated at the step 1014 and the coordinate of the lower end position of the target three-dimensional object calculated at the step 1015, and makes a temporary determination to determine whether or not this lower end height h is less than or equal to a predetermined height threshold. When having determined that the lower end height h is less than or equal to the height threshold, the CPU makes an "Yes" determination at the step 1018 to perform following processing of a step 1020 and a step 1022 in order.

Step 1020: the CPU makes a temporary determination that the target three-dimensional object is the "ground-contacting object".

Step 1022: the CPU makes a final determination that the target three-dimensional object is the "ground-contacting object" to set a value of the ground-contact flag of this target three-dimensional object to "1". The CPU associates the value of this ground-contact flag (a final determination result) with this target three-dimensional object to store the value in the RAM of the ECU 10. That is, at a computation timing at which a three-dimensional object is detected for the first time, the CPU makes a final determination, a result thereof being the same as a result of a temporary determination (A same processing will be performed at a step 1026 described later.).

On the other hand, when having determined at the step 1018 that the lower end height h exceeds the height threshold, the CPU makes a "No" determination at the step 1018 to perform following processing of a step 1024 and the step 1026 in order.

Step 1024: the CPU makes a temporary determination that the target three-dimensional object is the "floating object".

Step 1022: the CPU makes a final determination that the target three-dimensional object is the "floating object" to set a value of the ground-contact flag of this target three-dimensional object to "0". The CPU associates the value of this ground-contact flag (a final determination result) with this target three-dimensional object to store the value in the RAM of the ECU 10.

After the processing of the step 1022 or the step 1026, the CPU proceeds to a stop 1028 described later.

Figure 11:
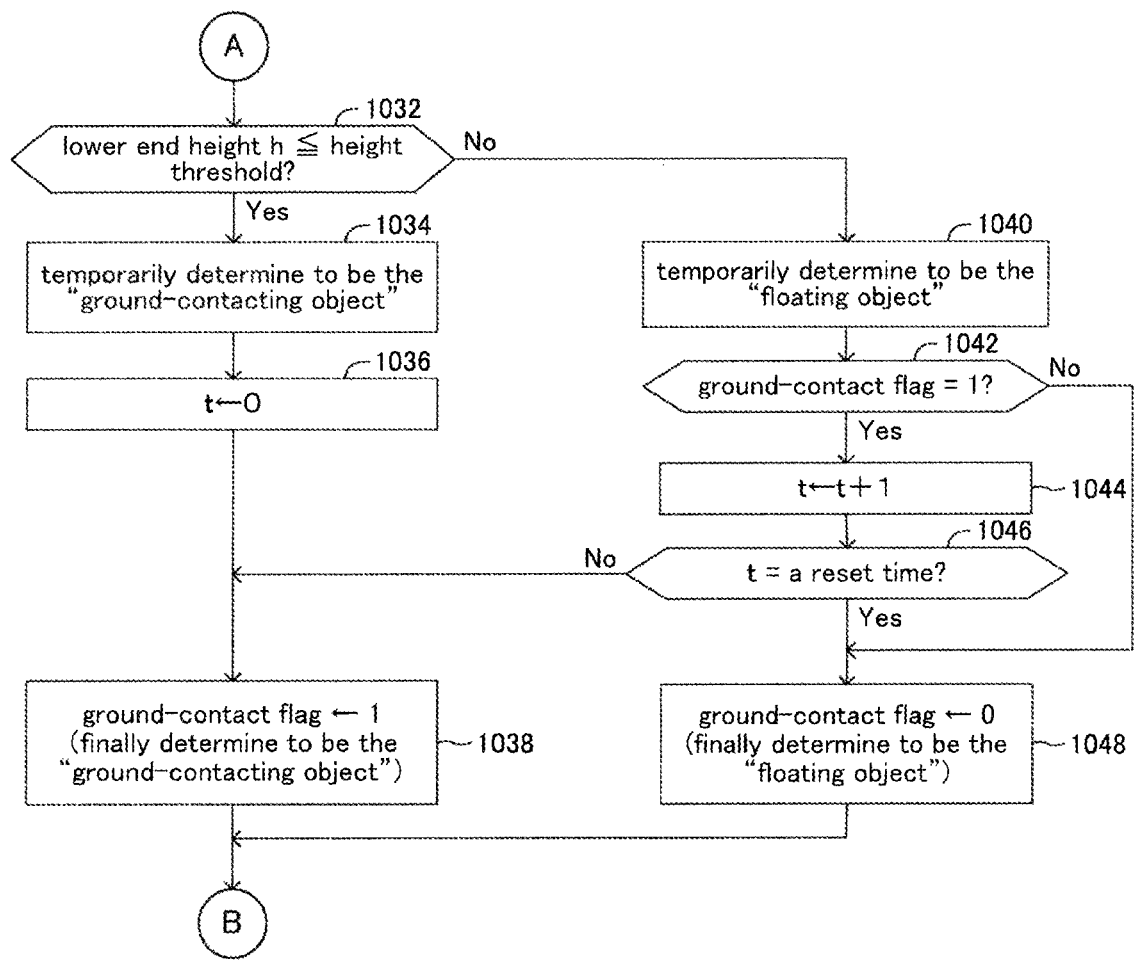
FIG. 11 is a flowchart (part 2) showing the routine performed by the CPU of the embodiment apparatus.

In contrast, when having determined that the CPU succeeded in tracking the target three-dimensional object at the step 1017, the CPU makes an "Yes" determination at the step 1017 (that is, determines that a three-dimensional object corresponding to the target three-dimensional object had been detected at the previous computation timing) to proceed to a step 1032 in FIG. 11.

At the step 1032, the CPU performs a same processing as the step 1018 in FIG. 10. When having determined that the lower end height h is less than or equal to the height threshold, the CPU makes an "Yes" determination at the step 1032 to perform following processing of a step 1034 through a step 1038 in order.

Step 1034: the CPU makes a temporary determination that the target three-dimensional object is the "ground-contacting object".

Step 1036: the CPU initializes a time-count timer t which is a timer for measuring a floating object determination continuation time. Thereby, the floating object determination continuation time is initialized.

Step 1038: the CPU makes a final determination that the target three-dimensional object is the "ground-contacting object" to set a value of the ground-contact flag of this target three-dimensional object to "1". The CPU associates the value of this ground-contact flag (a final determination result) with this target three-dimensional object to store the value in the RAM of the ECU 10.

In contrast, when having determined at the step 1032 that the lower end height h of the target three-dimensional object exceeds the height threshold, the CPU makes a "No" determination at the step 1032 and makes a temporary determination at a step 1040 that the target three-dimensional object is the "floating object".

Subsequently, the CPU proceeds to a step 1042 to determine whether or not the value of the ground-contact flag acquired at the step 1016 is "1". When having determined that the value of the ground-contact flag is "1", the CPU makes an "Yes" determination at the step 1042 and increases a value of the time-count timer t by 1 at a step 1044 (in other words, measures the floating object determination continuation time).

Next, the CPU proceeds to a step 1046 to determine whether or not the value of the time-count timer t increased at the step 1044 has reached a predetermined reset time. When having determined that the value of the time-count timer t has reached the reset time, the CPU makes an "Yes" determination at the step 1046 (that is, determines that the three-dimensional object is actually the floating object because although the final determination result at the previous computation timing is the "ground-contacting object" (step 1042: Yes), a temporary determination result that the target three-dimensional object is the "floating object" has continued for the reset time), and performs processing of a following step 1048.

Step 1048: the CPU makes a final determination that the target three-dimensional object is the "floating object" to set a value of the ground-contact flag of this target three-dimensional object to "0". Especially, when performing the processing of the present step after having made an "Yes" determination at the step 1046, it can be also said that the CPU "resets a value of the ground-contact flag of this target three-dimensional object from "1" to "0"". The CPU associates the value of this ground-contact flag with this target three-dimensional object to store the value in the RAM of the ECU 10.

In contrast, when having determined at the step 1046 that a value of the time-count timer t has not reached the reset time, the CPU makes a "No" determination at the step 1046 (that is, determines that "it is still impossible to conclude that this target three-dimensional object is actually the floating object because although as to the target three-dimensional object, the final determination result thereof at the previous computation timing being the "ground-contacting object", a temporary determination result of being the "floating object" has been continuing, the floating object determination continuation time has not reached the reset time"), and performs the processing of the aforementioned step 1038.

On the other hand, when having determined at the step 1042 that the value of the ground-contact flag is "0", the CPU makes a "No" determination at the step 1042 to perform the processing of the aforementioned step 1048. That is, in a case when the final determination result at the previous computation timing is the "floating object" (step 1042: No) and the temporary determination result at the current computation timing is the "floating object" as well (step 1032: No, step 1040), the CPU makes a final determination that the target three-dimensional object is the floating object also at the current computation timing.

After the processing of the step 1038 or the step 1048, or after the processing of the step 1022 or the step 1026 in FIG. 10, the CPU proceeds to the step 1028 in FIG. 10. At the step 1028, the CPU determines whether or not the processing after the step 1015 have been performed for all the three-dimensional objects detected at the step 1012. When having determined that the processing have not yet been performed for all the three-dimensional objects, the CPU makes a "No" determination at the step 1028 to return to the step 1015 and repeats the processing after the step 1015 for the rest three-dimensional objects. On the other hand, when having determined that the processing have been performed for all the three-dimensional objects, the CPU makes an "Yes" determination at the step 1028 and proceeds to a step 1030 to tentatively terminate the present routine.

Effects of the embodiment apparatus will be described. The embodiment apparatus determines whether a three-dimensional object is the ground-contacting object or the floating object based not only on a lower end height h of this three-dimensional object at the current computation timing, but also on a final determination result at the previous computation timing. Therefore, a possibility that the three-dimensional object which is actually the ground-contacting object is falsely determined to be the floating object due to an entry into the occlusion region R can be significantly reduced. As a result, a determination of whether the three-dimensional object is the ground-contacting object or the floating object can be made with a higher accuracy.

In addition, the embodiment apparatus measures the floating object determination continuation time in a case when a three-dimensional object which was finally determined to be the "ground-contacting object" at the previous computation timing is temporarily determined to be the "floating object" at the current computation timing. When having determined that the floating object determination continuation time has reached the rest time, the embodiment apparatus determines that the three-dimensional object is actually the floating object and changes (resets) a final determination result at the current computation timing from the "ground-contacting object" to the "floating object". Therefore, a possibility that a false determination that the three-dimensional object which is actually the floating object is the ground-contacting object continues to be made can be significantly reduced. As a result, a determination of whether the three-dimensional object is the ground-contacting object or the floating object can be made with a higher accuracy.

The three-dimensional object ground-contact determining apparatus according to the present embodiment has been described. However, the present invention is not limited to the aforementioned embodiment and may adopt various modifications within a scope of the present invention.

For example, when tracking a three-dimensional object, the embodiment apparatus may store brightness information of all the three-dimensional objects detected at the previous computation timing, associating the information with each of the three-dimensional objects. Besides, the embodiment apparatus may perform Block Matching of the brightness information of each three-dimensional object and the brightness information of the three-dimensional object at the current computation timing, and may identify (track) "a three-dimensional object, a degree of difference thereof being less than or equal to a predetermined degree of difference threshold and having a minimum brightness information" as a three-dimensional object corresponding to the three-dimensional object at the current computation timing.

The invention claimed is:

1. A three-dimensional object ground-contact determining apparatus mounted on a vehicle comprising;
    imaging means for taking an image of a region in front of said vehicle by means of a stereo camera;
    parallax information calculating means for calculating, based on a taken image taken by said imaging means, parallax information including a parallax of each of pixels composing said taken image;
    three-dimensional object detecting means for detecting a three-dimensional object in said taken image based on said parallax information;
    temporarily determining means;
        for calculating, based on said parallax information, a lower end height which is a height from a road surface to a lower end of said detected three-dimensional object; and
        for making a temporary determination every time a predetermined computation interval elapses to temporarily determine that said three-dimensional object is a ground-contacting object which is ground-contacted with said road surface when said lower end height is less than or equal to a predetermined threshold, and to temporarily determine that said three-dimensional object is a floating object floating from said road surface when said lower end height exceeds said predetermined threshold; and
    finally determining means for making a final determination every time said predetermined computation interval elapses to finally determine whether said three-dimensional object is a ground-contacting object or a floating object,
    wherein,
    said finally determining means is configured to;
        finally determine that said three-dimensional object is a ground-contacting object at a current computation timing when it is determined that said three-dimensional object is a ground-contacting object in at least one of said temporary determination at a current computation timing and said final determination at a previous computation timing; and
        finally determine that said three-dimensional object is a floating object at a current computation timing when it is determined that said three-dimensional object is a floating object in both of said temporary determination at a current computation timing and said final determination at a previous computation timing.

2. The three-dimensional object ground-contact determining apparatus according to claim 1, wherein,
    said finally determining means is configured to change a final determination result of said three-dimensional object from a ground-contacting object to a floating object when a temporary determination result that said three-dimensional object is a floating object continues for a predetermined reset time longer than said computation interval in a case when it is temporarily determined that said three-dimensional object which was finally determined to be a ground-contacting object at a previous computation timing is a floating object at a current computation timing.

3. A three-dimensional object ground-contact determining apparatus mounted on a vehicle comprising;
- a stereo camera for taking a stereo image of a region in front of said vehicle;
- a processor;
- a non-transitory computer-readable storage medium; and
- a set of computer-executable instructions stored on said computer-readable storage medium that cause said processor to implement:
- calculating, based on said stereo image, parallax information including a parallax of each of pixels composing said stereo image;
- detecting a three-dimensional object in said stereo image based on said parallax information;
- calculating, based on said parallax information, a lower end height which is a height from a road surface to a lower end of said detected three-dimensional object;
- making a temporary determination every time a predetermined computation interval elapses to temporarily determine that said three-dimensional object is a ground-contacting object which is ground-contacted with said road surface when said lower end height is less than or equal to a predetermined threshold, and to temporarily determine that said three-dimensional object is a floating object floating from said road surface when said lower end height exceeds said predetermined threshold; and
- making a final determination every time said predetermined computation interval elapses to finally determine whether said three-dimensional object is a ground-contacting object or a floating object, wherein, said processor is configured to;

finally determine that said three-dimensional object is a ground-contacting object at a current computation timing when it is determined that said three-dimensional object is a ground-contacting object in at least one of said temporary determination at a current computation timing and said final determination at a previous computation timing; and finally determine that said three-dimensional object is a floating object at a current computation timing when it is determined that said three-dimensional object is a floating object in both of said temporary determination at a current computation timing and said final determination at a previous computation timing.

4. A non-transitory computer-readable storage medium having computer-executable instructions, said instructions comprising;
- acquiring a set of images of a region in front of a vehicle, said set of images being taken by a stereo camera;
- calculating, based on said set of images, parallax information including a parallax of each of pixels composing said set of images;
- detecting a three-dimensional object in said set of images based on said parallax information;
- calculating, based on said parallax information, a lower end height which is a height from a road surface to a lower end of said detected three-dimensional object;
- making a temporary determination every time a predetermined computation interval elapses to temporarily determine that said three-dimensional object is a ground-contacting object which is ground-contacted with said road surface when said lower end height is less than or equal to a predetermined threshold, and to temporarily determine that said three-dimensional object is a floating object floating from said road surface when said lower end height exceeds said predetermined threshold; and
- making a final determination every time said predetermined computation interval elapses to finally determine whether said three-dimensional object is a ground-contacting object or a floating object, wherein, said making a final determination is configured to;

finally determine that said three-dimensional object is a ground-contacting object at a current computation timing when it is determined that said three-dimensional object is a ground-contacting object in at least one of said temporary determination at a current computation timing and said final determination at a previous computation timing; and finally determine that said three-dimensional object is a floating object at a current computation timing when it is determined that said three-dimensional object is a floating object in both of said temporary determination at a current computation timing and said final determination at a previous computation timing.

* * * * *